United States Patent [19]
Ray et al.

[11] Patent Number: 5,839,615
[45] Date of Patent: *Nov. 24, 1998

[54] TRACK MOUNT SYSTEM

[75] Inventors: Ralph D. Ray, Boulevard; Richard L. Ireland, Upland; Jon Apogee, Mira Loma, all of Calif.

[73] Assignee: Sport Carriers, Inc., Grand Terrace, Calif.

[ * ] Notice: The term of this patent shall not extend beyond the expiration date of Pat. No. 5,551,617.

[21] Appl. No.: 699,170

[22] Filed: Aug. 19, 1996

Related U.S. Application Data

[63] Continuation of Ser. No. 333,003, Nov. 1, 1994, Pat. No. 5,551,617.

[51] Int. Cl.$^6$ ................................................. B60R 9/045
[52] U.S. Cl. ............................................. 224/321; 224/326
[58] Field of Search .................................. 224/325, 326, 224/321, 309, 322, 329, 330, 331

[56] References Cited

U.S. PATENT DOCUMENTS

| | | | |
|---|---|---|---|
| 3,223,301 | 12/1965 | Helm | 224/326 |
| 3,253,755 | 5/1966 | Bott | 224/42.1 |
| 3,325,067 | 6/1967 | Helm | 224/42.1 |
| 3,554,416 | 1/1971 | Bott | 224/42.1 |
| 4,099,658 | 7/1978 | Bott | 224/42.1 F |
| 4,101,061 | 7/1978 | Sage et al. | 224/42.1 F |
| 4,109,891 | 8/1978 | Grendahl | 248/503.1 |
| 4,132,335 | 1/1979 | Ingram | 224/42.1 |
| 4,182,471 | 1/1980 | Bott | 224/326 |
| 4,185,799 | 1/1980 | Richards, Jr. | 244/118.5 R |
| 4,239,138 | 12/1980 | Kowalski | 224/321 |
| 4,244,501 | 1/1981 | Ingram | 224/324 |
| 4,245,764 | 1/1981 | Kowalski et al. | 224/321 |
| 4,264,025 | 4/1981 | Ferguson et al. | 224/321 |
| 4,269,340 | 5/1981 | Kowalski et al. | 224/326 |
| 4,270,681 | 6/1981 | Ingram | 224/321 |
| 4,278,376 | 7/1981 | Hunter | 410/130 |
| 4,279,368 | 7/1981 | Kowalski | 224/326 |
| 4,295,588 | 10/1981 | Kowalski et al. | 224/321 |
| 4,323,182 | 4/1982 | Bott | 224/321 |
| 4,341,332 | 7/1982 | Kowalski et al. | 244/326 |
| 4,372,469 | 2/1983 | Kowalski et al. | 224/321 |
| 4,406,386 | 9/1983 | Rasor et al. | 224/321 |
| 4,440,333 | 4/1984 | Bott | 224/324 |
| 4,448,337 | 5/1984 | Cronce | 224/321 |
| 4,469,261 | 9/1984 | Stapleton et al. | 224/321 |
| 4,473,178 | 9/1984 | Bott | 224/324 |
| 4,487,348 | 12/1984 | Mareydt | 224/321 |
| 4,500,020 | 2/1985 | Rasor | 224/321 |
| 4,501,385 | 2/1985 | Bott | 224/319 |
| 4,516,710 | 5/1985 | Bott | 224/324 |
| 4,588,117 | 5/1986 | Bott | 224/321 |
| 4,616,771 | 10/1986 | Heideman | 224/321 |

(List continued on next page.)

FOREIGN PATENT DOCUMENTS

| | | | |
|---|---|---|---|
| 0 578 297 A1 | 6/1993 | European Pat. Off. | |
| 3614740 | 11/1987 | Germany | 224/321 |
| 94/10007 | 5/1994 | WIPO | |
| 94/21490 | 9/1994 | WIPO | |

*Primary Examiner*—Linda J. Sholl
*Attorney, Agent, or Firm*—Lyon & Lyon LLP

[57] ABSTRACT

An adjustable article carrier track mount system that compensates for the cross-line radius or fall-away slope of a vehicle roof and easily and effectively locks the adjustable article carrier in place, has an elongated track, an end support operably connected to the track and adapted to slidably receive a crossbar, to slide longitudinally along the track, and rotate about the longitudinal axis of the track. To facilitate locking the adjustable article carrier in place, the track mount system includes a locking mechanism that is slidably received in the track and operably connected to the end support. The locking mechanism includes opposed wedges and a device adapted to force one of the wedges against another wedge to lock the locking mechanism within the track and thus the end support at a desired position along the track.

4 Claims, 6 Drawing Sheets

U.S. PATENT DOCUMENTS

| | | | |
|---|---|---|---|
| 4,684,048 | 8/1987 | Bott | 224/326 |
| 4,765,522 | 8/1988 | Bell | 224/326 |
| 4,768,691 | 9/1988 | Stapleton | 224/321 |
| 4,768,692 | 9/1988 | Schneider | 224/326 |
| 4,815,643 | 3/1989 | Heideman | 224/321 |
| 4,826,061 | 5/1989 | Heideman | 224/326 |
| 4,834,448 | 5/1989 | Sakamoto et al. | 296/210 |
| 4,911,348 | 3/1990 | Rasor et al. | 224/321 |
| 4,982,886 | 1/1991 | Cucheran | 224/321 |
| 4,988,026 | 1/1991 | Rasor et al. | 224/321 |
| 5,004,139 | 4/1991 | Storm et al. | 224/324 |
| 5,007,570 | 4/1991 | Himmel | 224/321 |
| 5,016,798 | 5/1991 | Stapleton et al. | 224/326 |
| 5,170,920 | 12/1992 | Corrente et al. | 224/321 |
| 5,320,264 | 6/1994 | Weir | 224/321 |

5,839,615

TRACK MOUNT SYSTEM

This is a continuation of application Ser. No. 08/333,003, filed Nov. 1, 1994 now U.S. Pat. No. 5,551,617.

FIELD OF THE INVENTION

This invention relates to article carriers for automotive vehicles, specifically to an adjustable article carrier track mount system.

BACKGROUND OF THE INVENTION

Article carriers, commonly referred to as luggage racks, have long been utilized to carry loads on the exterior of automotive vehicles. The designs of these carriers have advanced from the purely functional rectangular configuration to the more aerodynamic and adjustable configurations.

Adjustable carriers were developed to permit the user to adjust the carriers to the size of the load and provide additional securement. Typically in such assemblies, crossbar members are attached to end supports that are mounted on tracks longitudinally secured to the vehicle. End supports are allowed to travel longitudinally along the tracks varying the space between the crossbar members in accordance with the desired load size. Locking assemblies are provided to secure the end supports in the desired position along the tracks. With such a system, varying load sizes can be accommodated in a more secure fashion.

However, the adjustable carrier systems of the past are not without shortcomings. For example, one of the disadvantages of these systems is that the tracks to which the end supports are mounted are rolled form steel. Although roll-form tracks are an effective means to accommodate the varying cross-car and longitudinal radii of different vehicle roof line designs, roll-forming results in a high-profile carrier. High-profile article carriers tend to reduce the aerodynamics and aesthetic value of the vehicle design. Moreover, the roll-forming of tracks to accommodate the wide variety of car designs has proven to be expensive and inefficient.

Furthermore, the locking assemblies employed in these adjustable article carriers have been found to be unsatisfactory. Various locking assemblies have been utilized from nuts and bolts systems to lever and locking pin systems. However, these assemblies tend to be inconvenient to use, to induce unacceptable drag as the vehicle travels, or to ineffectively lock the end supports in place. Therefore, it would be desirable to have an adjustable article carrier with a low profile for greater aerodynamics and aesthetics, that is capable of compensating for the cross-line radius or fall-away slope of the vehicle roof, that is less expensive to produce and stock, that is convenient for the user to use, and that will easily and effectively lock the end supports in place while the vehicle is in motion.

SUMMARY

The track mount system of the present invention serves to facilitate compensation within an adjustable article carrier for the cross-line radius or fall-away slope of a vehicle roof, and easy and effective locking in place of an adjustable article carrier while the vehicle is in motion. It preferably has an elongated track and an end support operably connected to the track. The end support is adapted to slidably receive a crossbar and longitudinally slide along the track. In addition, the end support is able to rotate about a longitudinal axis of the track to compensate for the cross-line radius or fall-away slope of the vehicle roof.

Preferably, the track mount system would include a locking mechanism operably connected to the end support and slidably received within the track. The locking mechanism includes opposed wedges and a device adapted to force one wedge against another wedge to lock the locking mechanism within the track, thus locking the end support in a desired position along the track.

An object of this invention is to provide an improved track mount system for an adjustable article carrier.

Further objects and advantages of the present invention will become apparent from consideration of the drawings and ensuing description.

DESCRIPTION OF THE EMBODIMENT

Figure 1:
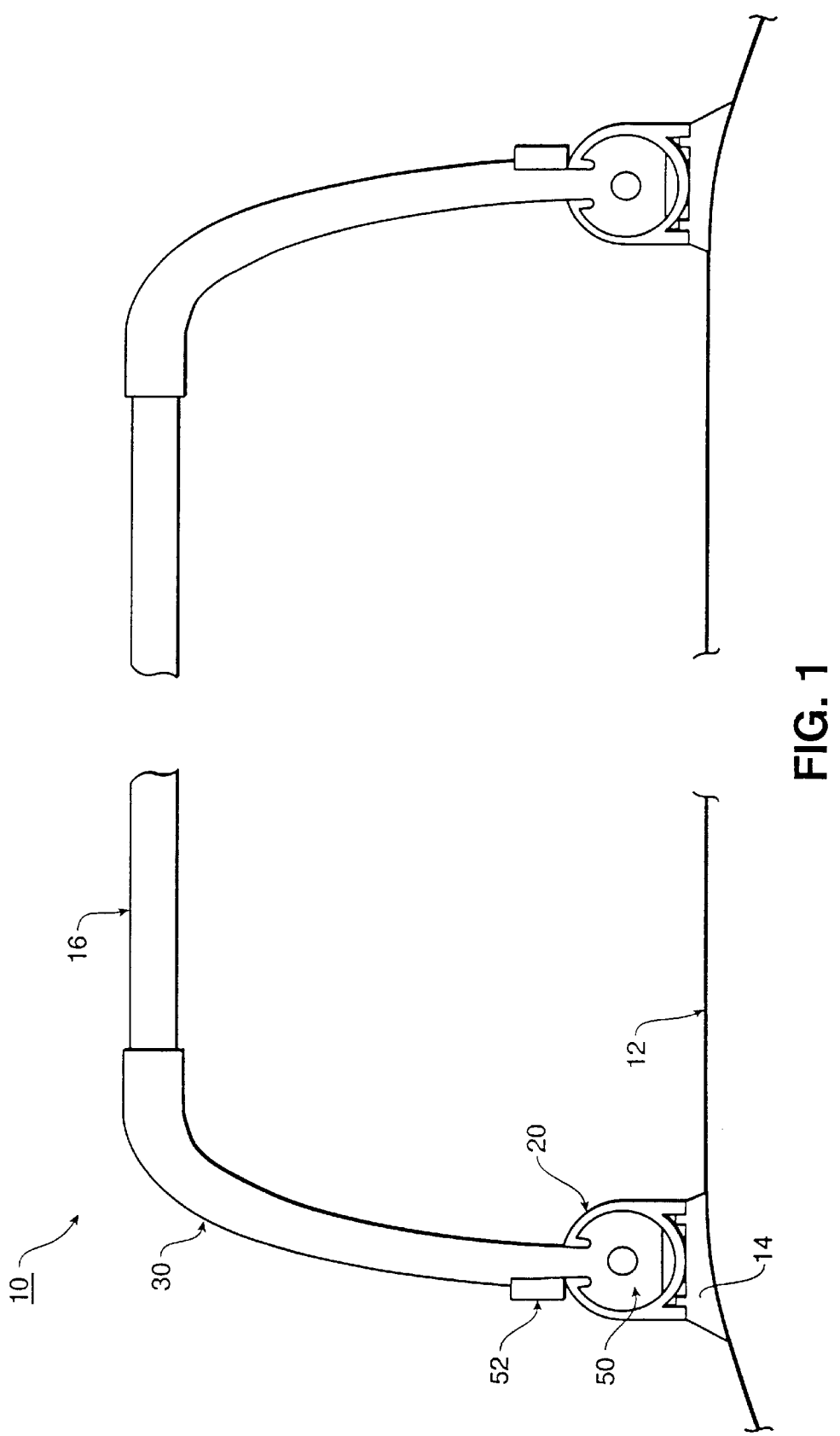
FIG. 1 is a front profile view of the track mount system mounted to a vehicle roof.
Figure 2:
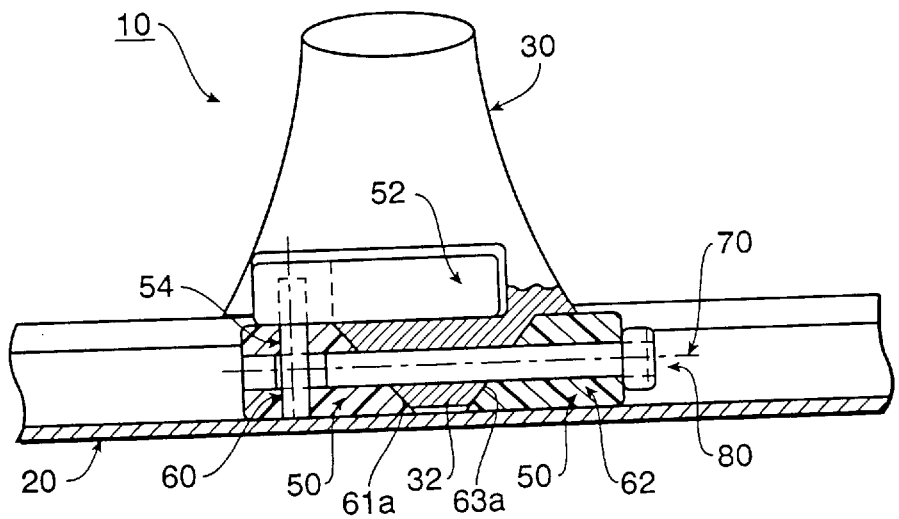
FIG. 2 is side view of a partial assembly of the track mount system including an end support, a lever with an eccentric shaft, a locking mechanism, and a track.
Figure 3:
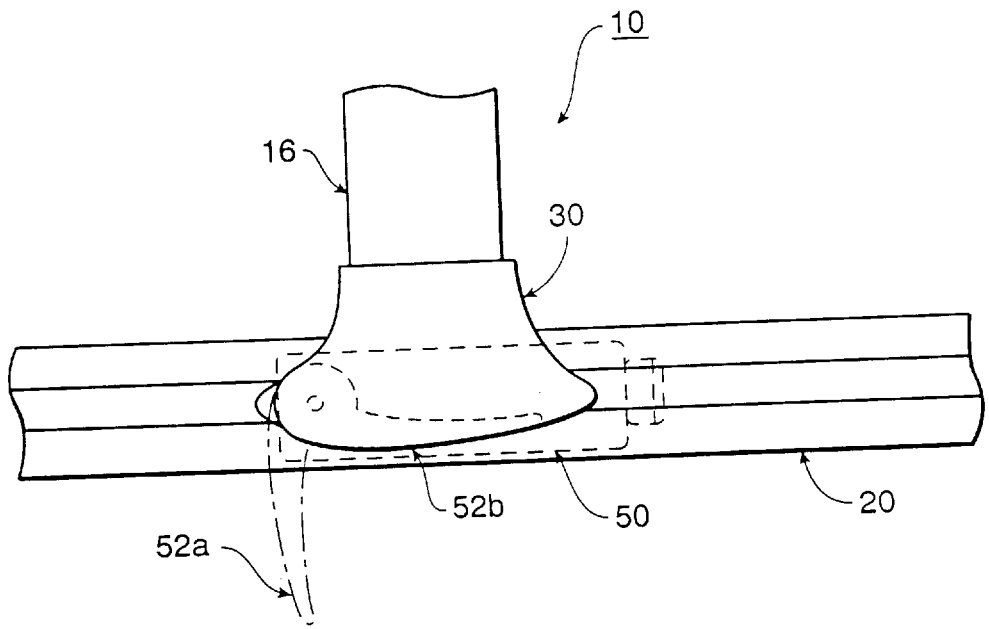
FIG. 3 is a top view of the track mount system assembly including a crossbar, an end support, a locking mechanism, a lever, and a track.

Referring now in detail to the drawings, therein illustrated is a novel track mount system for a vehicle article carrier. As shown in FIG. 1, the track mount system 10 comprises a pair of parallel disposed tracks 20 longitudinally mounted on a vehicle roof 12. A pair of gaskets 14 interpose the tracks 20 and the roof 12. A pair of end supports 30 are operably mounted on the tracks 20 and are interconnected by a crossbar 16. As shown in FIGS. 2 and 3, the end supports 30 are capable of traveling longitudinally along the tracks 20 and, when used in combination with a second assembly of the end supports 30 and the connecting crossbar 16, the end supports 30 and the crossbars 16 can be positioned along the track 20 to accommodate varying load sizes.

Figure 4:
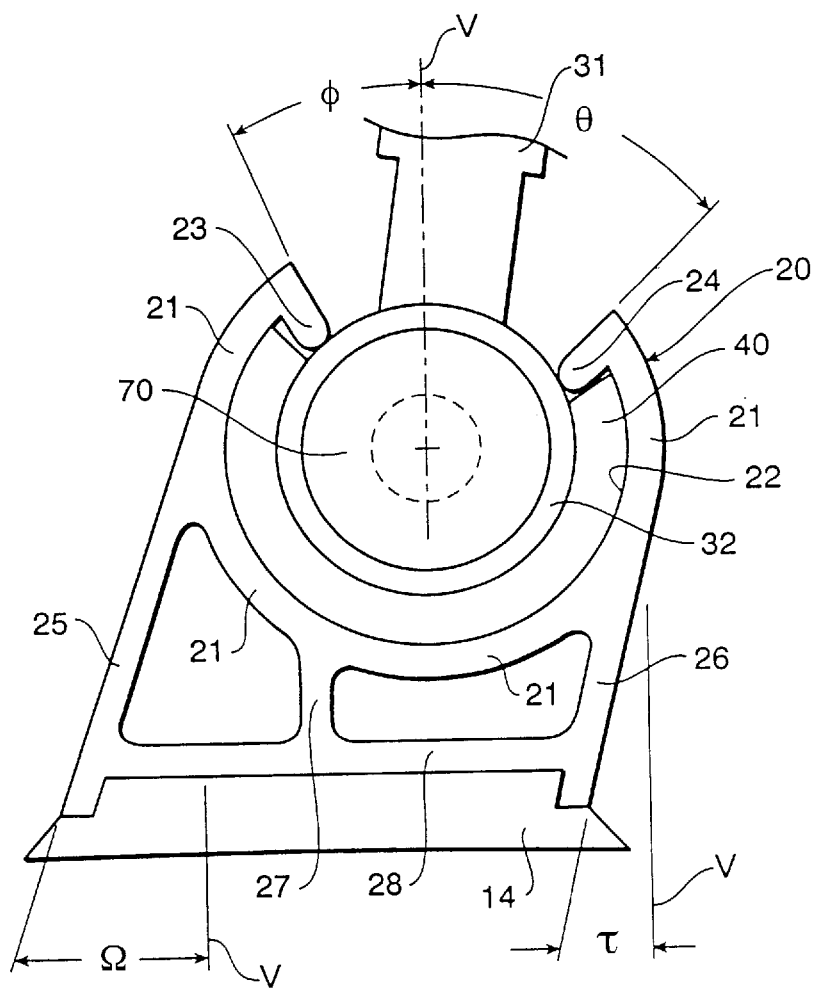
FIG. 4 is a front profile view of an assembly including a track, a gasket, a slide, a pedestal of an end support and a wedge bolt.

FIG. 4 shows a front profile view of an assembly comprising the track 20, the gasket 14, a guide 40, a pedestal 32, and a wedge bolt 70. The track 20 is preferably a straight extrusion, preferably extruded from a noncorrosive material such as aluminum or aluminum composite, with a track body 21 forming a substantially circular front profile. The track 20 extrusion is preferably sufficiently flexible to adapt to the longitudinal curvature of the vehicle roof 12. The body 21, however, is not a closed circle, rather it terminates at inwardly and angularly extending rails 23 and 24. The rails 23 and 24 extend inwardly at angles φ and θ, respectively, from the vertical V. The termination of the body 21 at the rails 23 and 24 forms an opening in the upper portion of the track 20. The angle φ, along which the rail 23 is directed, is preferably 10°–30°, most preferably substantially 22°, from the vertical V, while the angle θ, along which the rail 24 is directed, is preferably 25°–55°, most preferably substantially 45°, from the vertical V, thus creating a gap in the upper portion of the track body 21 that extends 35°–85°, most preferably substantially 67°, along the circumference of the track body 21. This configuration, as will be discussed in more detail later, allows the end support 30 to rotate between the rails 23 and 24 through an angle of rotation of 35°–85°, most preferably substantially 67°, to compensate for the cross-line radius or fall-away slope of the vehicle roof 12, as the end supports 30 travel longitudinally along the tracks 20.

The inner surface 22 of the track body 21 is preferably smooth to slidably receive a guide 40, discussed in more detail below. The guide 40 guides the pedestal 32 longitudinally along the track.

Supporting the track body 21 is a pair of leg supports 25 and 26 that mount on the gasket 14. The leg support 25 is longer than the leg support 26 and is sloped at an angle Ω from the vertical V, while leg support 26 is also sloped at an angle τ from the vertical V. The angles Ω and τ are preferably 20° and 12°, respectively. This configuration of the leg supports 25 and 26 orients the opening of the track between the rails 23 and 24 such that the opening of the track 20 is tilted inwardly toward the longitudinal center line of the vehicle roof 12. This orientation tends to parallel the force vector that the track 20 is expected to experience during operation. This arrangement advantageously permits use of a substantially flat gasket 14.

A substantially horizontal base 28 extends between leg supports 25 and 26. The base 28 is used to fasten the track 20 to the roof 12 of the vehicle. The heads of a fastener (not shown) used to fasten the track 20 to the vehicle roof 12 is easily recessed away from the track body 21 into a cavity formed by the base 28, the leg supports 25 and 26, and the body 21 of the track 20. If further rigidity is desired, an intermediate support 27 may optionally be added to extend vertically from the base 28 to the body 21 of the track 20.

An alternate track embodiment is shown in FIG. 1. The track 20 in FIG. 1 includes a circular body 21, rails 23 and 24, and leg supports 25 and 26 as in the previous embodiment. The lower end of the body 21 is used to fasten the track 20 to the vehicle roof 12. Thus, a gap is required to exist between the locking mechanism 50 and the lower end of the body 21 to prevent interference between a fastener head (not shown) and the locking mechanism 50 as the end support 30 slides longitudinally along the track 20. This arrangement provides an even lower profile for the track mount system 10.

Figure 5:
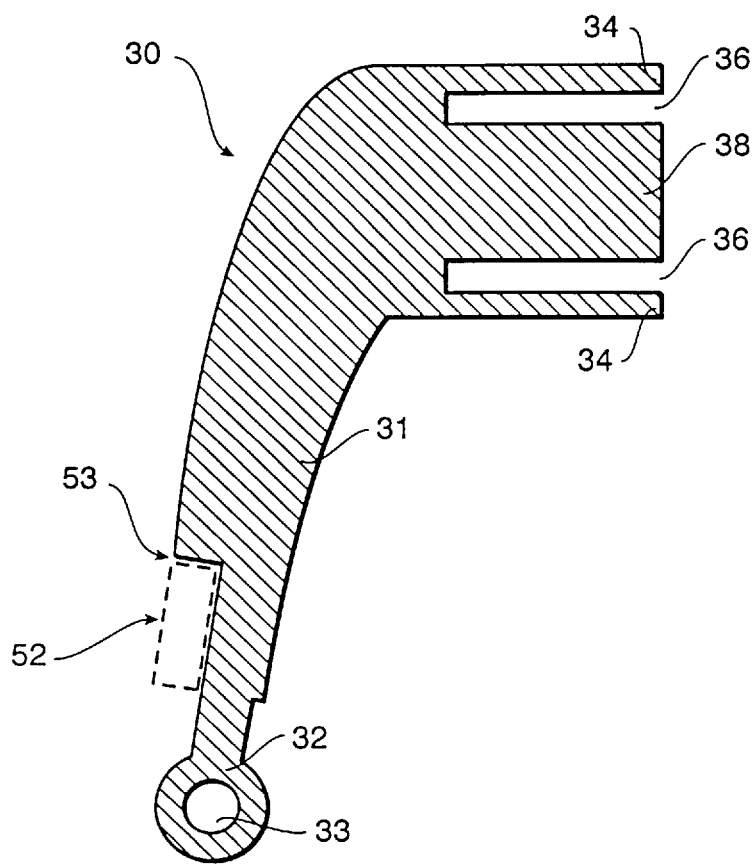
FIG. 5 is a front profile view of an end support.
Figure 6:
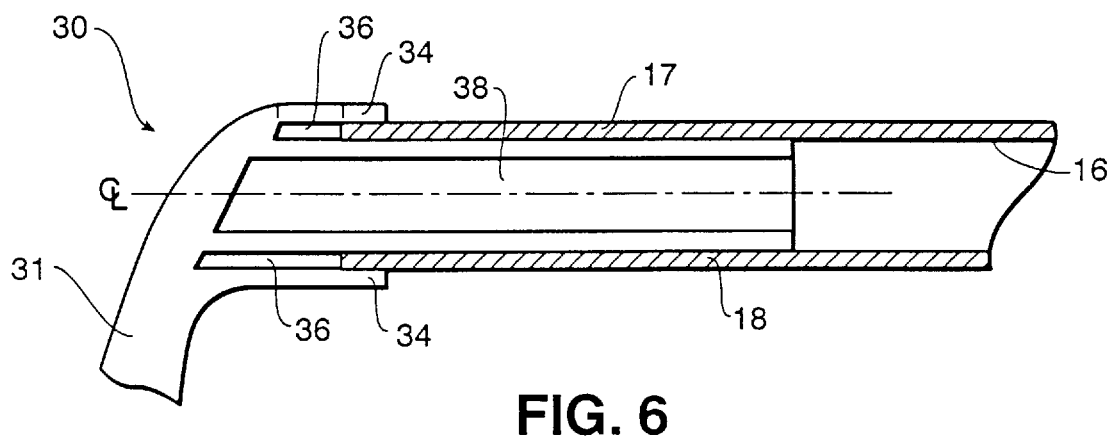
FIG. 6 is a front profile view of an assembly including a partial front profile of an end support and a partial profile of a crossbar.
Figure 7:
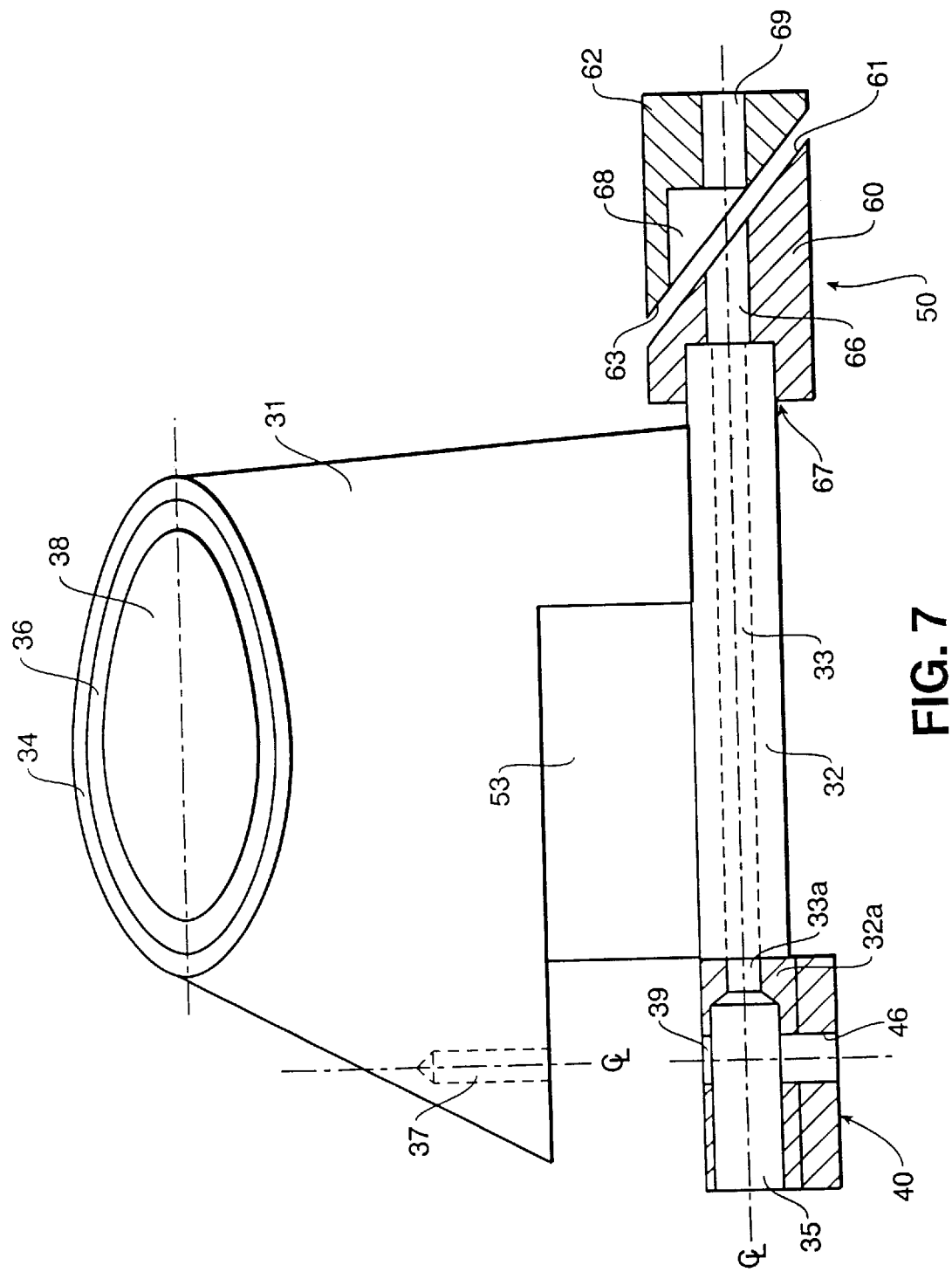
FIG. 7 is a side and partial sectional view of an assembly including an end support and pedestal, a guide, and wedges of a locking mechanism.

Referring to FIGS. 5, 6 and 7, the end supports 30 comprise a substantially aerodynamic body 31 which is generally canted inwardly toward the center line of the vehicle roof 12. The upper portion of the body 31 forms a sleeve 34 and a stem 38, both extending away from the body 31 inwardly toward the longitudinal center line of the vehicle roof 12. The sleeve 34 and the stem 38 form a channel 36 therebetween that is adapted to receive an upper wall 17 and a lower wall 18 of the crossbar 16. The walls 17 and 18 of the crossbar 16 slide over the stem 38 and are slidably received within the channels 36, with the ends of walls 17 and 18 being hidden by the sleeves 34. In addition, the body 31, of the end support 30, extends downwardly to a substantially circular pedestal 32, as shown in FIG. 5, that is rotatably received within the guide 40, discussed in detail in FIG. 8. This configuration, comprising a substantially circular pedestal 32 rotatably received within a guide 40 and a crossbar 16 slidably received within a sleeve 34 and channel 36 of an end support 30, allows the track mount system 10 to compensate for the cross-line radius or fall-away slope of the vehicle roof 12. Thus, as the end support 30 slides longitudinally along the track 20, the end support body 31 will tend to move inwardly and outwardly while rotating about its pedestal 32 as the cross-line radius or fall-away slope of the vehicle roof 12 changes. As this movement occurs, the walls 17 and 18 of the crossbar 16 slidably adjust over the stem 38 within the channels 36, while remaining hidden by the sleeves 34. As a result of this method of cross-line radius or fall-away slope compensation, the track mount system 10 is able to maintain a low profile extending along the vehicle roof 12.

Figure 8:
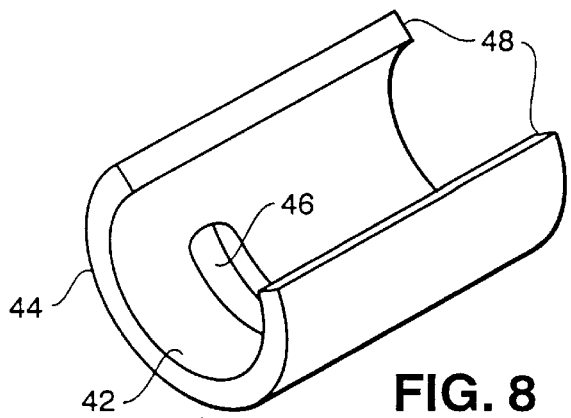
FIG. 8 is a perspective view of a guide.

As shown in FIG. 4, the guide 40 has a substantially circular profile substantially similar to that of the track 20. Referring to FIG. 8, the guide 40 preferably has a smooth outer surface 44 that allows it to slide longitudinally along the track 20 and a smooth inner surface 42 that allows rotation of the pedestal 32 within the guide 40. The substantially circular profile of the guide 40 terminates at edges 48. The edges 48 are angled inwardly to mate with the angled rails 23 and 24 of the track 20 shown in FIG. 4. Preferably, a retaining slot 46 is cut through the lower portion of the guide 40 and is used to retain the guide on the pedestal 32. In the embodiment illustrated in FIG. 7, the guide 40 is attached to the forward portion 32a of the 32.

Referring to FIGS. 2 and 7, a novel locking mechanism 50 of the track mount system 10 is therein illustrated. Locking mechanism 50 preferably comprises forward and aft wedges 60 and 62, a wedge bolt 70, an adjustment nut 80, and an eccentric shaft 54 attached to a lever 52. The wedge bolt 70, adjustment nut 80, and lever 52 with eccentric shaft 54 are omitted from FIG. 7 for clarity. The wedges 60 and 62, respectively, are oriented either forward and aft of a wedged pedestal 32 as shown in FIG. 2, or simply aft of a pedestal 32 as shown in FIG. 7.

Figure 9:
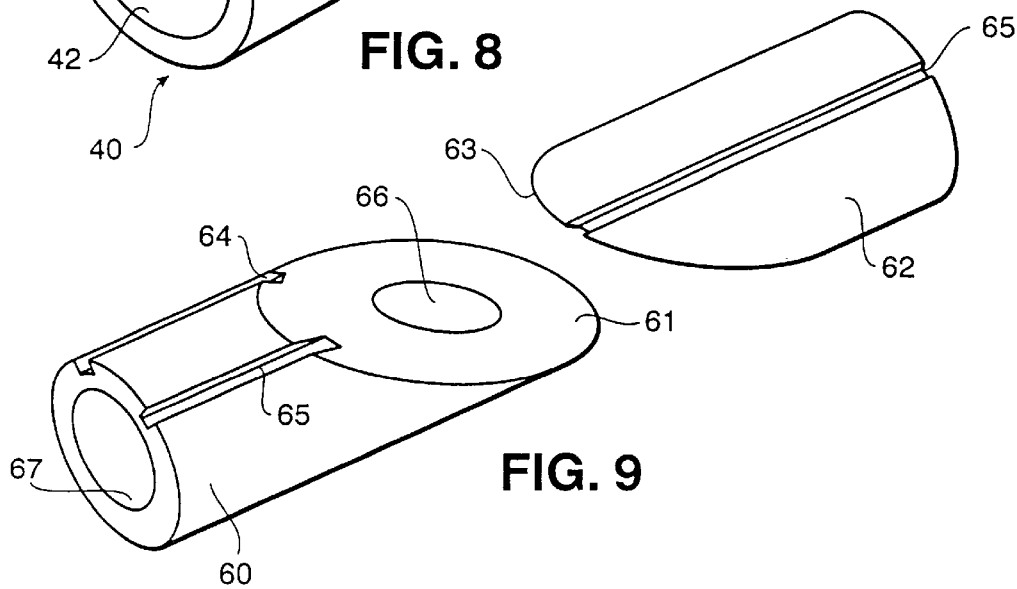
FIG. 9 is a perspective view of forward and aft wedges.

Referring to FIGS. 7 and 9, the wedge 60 is shown to be substantially cylindrical with a wedge or chamfered face 61. A bore hole 67 is bored into the non-chamfered end of the wedge 60, and enables the wedge 60 to mate with the aft end of the pedestal 32. A through-hole 66 passes through the wedge 60 from the wedged face 61 to the bore hole 67 and matches up an identical through-hole 33 in the pedestal 32. A pair of opposing slots 64 and 65 extend the length of the upper portion of the wedged 60. The slots 64 and 65 are configured and adapted to receive the rails 23 and 24 of the track 20 shown in FIG. 4, such that, upon full assembly of the track mount system 10, the wedge 60 is slidably received, and unable to rotate, within the track 20.

The aft wedge 62 is similar to the forward wedge 60, wherein wedge 62 is also substantially cylindrical comprising identical slots 64 and 65 and mating oppositely-sloped wedge or chamfered face 63. The slots 64 and 65 of both wedges 60 and 62 enable the wedges 60 and 62 to be properly oriented within the track 20 such that the mating wedge faces 61 and 63 are properly aligned. In addition, a wedge bolt bore 68 is bored into the wedge 62 from the wedge face 63, and an adjustment nut through-hole 69 is drilled into the wedge 62 from the non-wedged faced end of the wedge 62 to intersect the wedge bolt bore 68.

Figure 10:
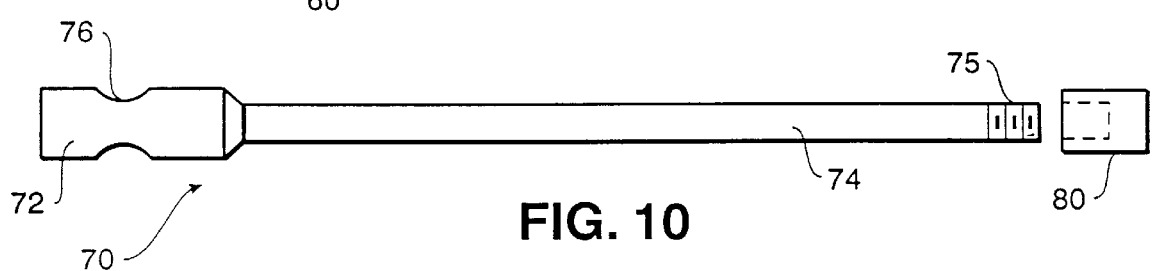
FIG. 10 is a side profile view of a wedge bolt and an adjustment nut.

Referring to FIG. 10, the wedge bolt 70 comprises a cylindrical head 72 that steps down to a cylindrical shaft 74 of smaller diameter. The shaft 74 is threaded at the end 75 opposite the head 72 end of the wedge bolt 70. An adjustment nut 80 is adapted to rotatably receive the threaded end 75 of the shaft 74.

When assembled, the head 72 is slidably received within a bore hole 35 in the forward portion 32a of the pedestal 32, while the shaft 74 extends through through-holes 33a and 33 of the pedestal 32, the bore 67 and through-hole 66 of the wedge 60, and bore 68 and through-hole 69 of wedge 62. The adjustment nut 80 is received within hole 69 and rotatably attaches to the shaft 74 at the threaded end 75 to adjust the wedges 60 and 62, respectively, locking the end supports 30 in place along the track 20.

Figure 11:
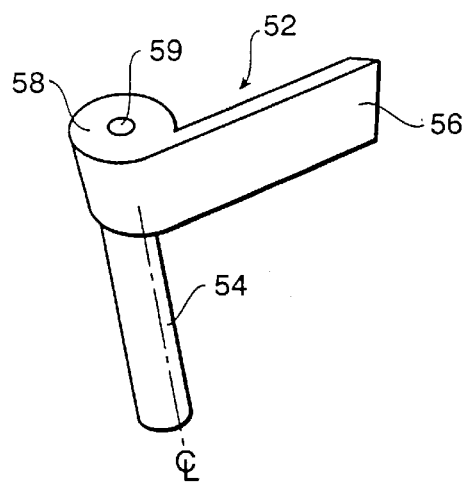
FIG. 11 is a perspective view of a lever and an eccentric shaft assembly.
Figure 12:
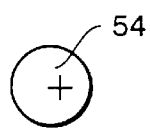
FIG. 12 is an end view of the eccentric shaft depicted in FIG. 11.

However, fine tune adjustment of the wedges 60 and 62 is accomplished by a device preferably utilizing a lever 52 and an eccentric shaft 54 assembly as shown in FIG. 11. The eccentric shaft 54 extends from the cylindrical base 58 through a through-hole 39 in the forward pedestal 32a, a through-hole 76 in the head 72 of the wedge bolt 70, and on into the slot 46 of the guide 40. Rotation of the eccentric shaft 54 about its eccentric axis, shown in FIG. 12, forces the wedge bolt 70 to move in a reciprocal motion. The shaft 54 also acts to retain the guide 40 on the pedestal 32a. The lever 52 is retained in operable connection with the end support 30 by a retaining pin (not shown) that is received within a bore 59 in the lever base 58 and a bore 37 in the end support body 31. A recess 53 in the body 31 of the end support 30 is adapted to receive a lever arm 56 to preserve the aerodynamic feature of the end support 30.

In operation, after assembly of the end support 30, the lever 52 with eccentric shaft 54, the wedge bolt 70, the guide 40, and the wedges 60 and 62, the guide 40, the pedestal 32, and the wedges 60 and 62 are slid into the track 20 while aligning the edges 48 of the guide 40 and the slots 64 and 65 of the wedges 60 and 62 with the rails 23 and 24 of the track 20. With the assembly slidably received in the track 20 and the lever 52 in an unlocked position 52a, as shown in FIG. 3, the adjustment nut 80 is screwed onto the threaded end 75 of the shaft 74. The adjustment nut 80 is adjusted until the wedges 60 and 62 are snug against one another and the track 20, but still in sliding communication with the track 20. After sliding the end support 30 to a desired position along the track 20, the lever 52 can be moved to its locked position 52b, as shown in FIG. 3, thus locking the end support 30 in place. As the lever 52 moves from its unlocked position 52a to its locked position of 52b, the eccentric shaft 54 rotates within through-hole 76 of wedge bolt 70, further tensioning the wedge bolt 70 and pulling it toward the forward portion of the pedestal 32a. This generally longitudinal motion forces the wedges 60 and 62 against one another and to further move the wedges 60 and 62 longitudinally and transversely relative to one another along their respective faces 61 and 63. The wedge bore 68 allows the wedges 60 and 62 to move relative to one another without interference with the wedge bolt 70. The movement of the wedges 60 and 62 relative to one another caused by moving the lever 50 from an unlocked 52a to a locked 52b position is sufficient to easily and effectively lock the end support 30 in a desired position along the track 20.

As noted above, FIG. 2 shows an alternate embodiment for the locking mechanism 50. The locking mechanism 50 similarly comprises forward and aft wedges 60 and 62, respectively, however, the wedge faces 61 and 63 are oriented as mirror images to one another. A pedestal 32 is wedge-shaped having a forward wedged faced 61a and an aft wedge faced 63a that mate with wedge faces 61 and 63, respectively, of the forward and aft wedges 60 and 62. The head 72 of the wedge bolt 70 is received within a bore in the forward wedge 60. The shaft 74 of the wedge bolt 72 extends through through-holes extending out of forward wedge 60 from the bore in the forward wedge 60, through the wedge pedestal 32 and through the aft wedge 62, wherein the adjustment nut 80 is able to screw onto the threaded end 75 of the shaft 74. The lever 52 is operably connected to the end support in similar fashion as described and illustrated in FIGS. 7 and 11. The eccentric shaft 54 extends down from the lever 52 into a bore in the forward wedge 60 retaining the forward wedge 60 in place, while passing through the through-hole 76 in the wedge bolt 70. As in the previous embodiment, rotation of the eccentric shaft 54 forces the wedge bolt 70 to move in a reciprocal motion.

After assembly of the end support 30 with pedestal 32, the forward and aft wedges 60 and 62, the wedge bolt 70, the lever 52 with eccentric shaft 54, and the adjustment nut 80, the forward and aft wedges 60 and 62 and the pedestal 32 are slid into the track. The forward and aft wedges 60 and 62 act as both guides to slide the end support 30 along the track 20 and brakes for a locking mechanism 50 to lock the end support 30 in place. The pedestal 32 is able to rotate about the wedge bolt 70 within the track. Thus, this configuration provides an effective locking mechanism 50 along with the capability of compensating for the cross-line radius or fall-away slope of the vehicle roof 12 by allowing rotation of the end supports 30 via its pedestal 32 about the wedge bolt 70.

In operation, after assembly of the end support 30 with the pedestal 32, the lever 52 with the eccentric shaft 54, the wedge bolt 70, and the wedges 60 and 62, the pedestal 32 and the wedges 60 and 62 are slid into the track 20. With the assembly slidably received in the track 20 and the lever 52 in an unlocked position 52a, as shown in FIG. 3, the adjustment nut 80 is screwed onto the threaded end 75 of the shaft 74. The adjustment nut 80 is adjusted until the wedges 60 and 62 are snug against the pedestal 32 and the track 20, but still in sliding communication with the track 20. After sliding the end support 30 to a desired position along the track 20, the lever 52 can be moved to its locked position 52b, as shown in FIG. 3, thus locking the end support 30 in place. As the lever 52 moves from its unlocked position 52a to its locked position 52b, the eccentric shaft 54 rotates within through-hole 76 of the wedge bolt 70, further tensioning the wedge bolt 70 and pulling it toward the forward wedge 60. This generally longitudinal motion forces the wedges 60 and 62 against the pedestal 32 and to further move the wedges 60 and 62 longitudinally and transversely relative to the pedestal 32 along their respective faces 61, 63, 61a and 63a. The movement of the wedges 60 and 62 relative to the pedestal 32 caused by moving the lever 50 from an unlocked 52a to a locked 52b position is sufficient to easily and effectively lock the end support 30 in a position along the track 20.

Although it is preferred to lock the end support 30 in place along the track 20 by tensioning the wedge bolt 70 to draw aft wedge 62 forward, a structurally equivalent device can be used to push the aft wedge 62 forward. Such a device would essentially accomplish the desired effect of the previous embodiments of locking the end support 30 in place along the track 20.

While the above description contains many specifics, these should not be construed as limitations on the scope of the invention, but rather as an example of the preferred embodiments thereof. Many other variations are possible.

Accordingly, the scope of the present invention should be determined not by the embodiments illustrated above, but by the appended claims and their legal equivalents.

What is claimed is:

1. A track mount system for a vehicle carrier comprising
an elongated track,
a guide slidably retained within said track,
an end support adapted to slidably receive a crossbar, and
a pedestal extending from said end support into said track and rotatably connecting to said guide to compensate for the fall-away slope of a vehicle roof as said guide and said pedestal slide longitudinally along said track, said pedestal comprising a first inclined surface, said track mount system further comprising a locking member operably connected to said pedestal, said locking member having a second inclined surface opposing said first inclined surface.

2. A track mount system for a vehicle carrier comprising
an elongated track,
an end support operably connected to said track and adapted to slide longitudinally along said track, and
a locking mechanism slidably retained within said track and operably connected to said end support, said locking mechanism including
first and second locking members having first and second opposing inclined surfaces, respectively,
a lever operably connected to said end support, and
a rod extending from said lever, said rod being operably connected to said first and second locking members to draw said second inclined surface of said second locking member against said first inclined surface of said first locking member as said lever is moved from a first position to a second position.

3. The track mount system of claim 2, wherein said rod of said locking mechanism is an eccentric shaft.

4. The track mount system of claim 3, wherein said device further comprises a tensioning bolt extending from said first locking member through said second locking member.

* * * * *

UNITED STATES PATENT AND TRADEMARK OFFICE
CERTIFICATE OF CORRECTION

PATENT NO. : 5,839,615
DATED : Nov. 24, 1998
INVENTOR(S) : Ralph D. Ray, et al

It is certified that error appears in the above-identified patent and that said Letters Patent is hereby corrected as shown below:

Column 2, line 18, after "is", insert --a--.

Column 3, line 2, change "φand" to --φ and--.

Column 3, line 27, change "Ωand" to --Ω and--.

Signed and Sealed this

Twenty-seventh Day of July, 1999

Attest:

Q. TODD DICKINSON

*Attesting Officer*     *Acting Commissioner of Patents and Trademarks*